(12) United States Patent
Boecker et al.

(10) Patent No.: US 8,229,644 B2
(45) Date of Patent: Jul. 24, 2012

(54) ADAPTIVE CRUISE CONTROL FEATURING DETECTION OF A TRAFFIC JAM

(75) Inventors: Juergen Boecker, Stuttgart (DE); Dieter Hoetzer, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 653 days.

(21) Appl. No.: 12/083,957

(22) PCT Filed: Sep. 6, 2006

(86) PCT No.: PCT/EP2006/066062
§ 371 (c)(1),
(2), (4) Date: Aug. 10, 2009

(87) PCT Pub. No.: WO2007/045523
PCT Pub. Date: Apr. 26, 2007

(65) Prior Publication Data
US 2009/0299598 A1    Dec. 3, 2009

(30) Foreign Application Priority Data

Oct. 20, 2005  (DE) .................... 10 2005 050 277

(51) Int. Cl.
*B60T 7/12* (2006.01)
*G05D 1/00* (2006.01)
*G06F 7/00* (2006.01)
*G06F 17/00* (2006.01)

(52) U.S. Cl. ........................ 701/96; 701/119
(58) Field of Classification Search .............. 701/96, 701/119
See application file for complete search history.

(56) References Cited

U.S. PATENT DOCUMENTS

| 6,580,996 | B1* | 6/2003 | Friedrich | 701/96 |
| 7,706,954 | B2* | 4/2010 | Michi et al. | 701/96 |
| 2002/0183915 | A1* | 12/2002 | Sielagoski et al. | 701/96 |
| 2003/0135318 | A1* | 7/2003 | Tellis et al. | 701/96 |
| 2004/0010362 | A1* | 1/2004 | Michi et al. | 701/93 |
| 2005/0043879 | A1* | 2/2005 | Desens et al. | 701/96 |
| 2005/0209766 | A1* | 9/2005 | Perisho et al. | 701/96 |
| 2005/0216169 | A1* | 9/2005 | Arai | 701/96 |
| 2006/0217866 | A1* | 9/2006 | Moebus | 701/70 |
| 2006/0224294 | A1* | 10/2006 | Kawazoe et al. | 701/93 |
| 2007/0215401 | A1* | 9/2007 | Braeuchle et al. | 180/170 |
| 2009/0299598 | A1* | 12/2009 | Boecker et al. | 701/96 |

FOREIGN PATENT DOCUMENTS

| DE | 196 06 258 | 4/1997 |
| DE | 198 38 818 | 3/2000 |
| DE | 199 49 499 | 4/2001 |
| DE | 199 58 520 | 6/2001 |
| DE | 103 49 434 | 6/2004 |
| EP | 1 288 055 | 3/2003 |

(Continued)

*Primary Examiner* — Mary Cheung
*Assistant Examiner* — Michael D Lang
(74) *Attorney, Agent, or Firm* — Kenyon & Kenyon LLP

(57) ABSTRACT

An adaptive cruise control for motor vehicles, having a sensor system for locating preceding vehicles and a controller which regulates the speed of the vehicle and/or the clearance from a preceding vehicle, based on specified control parameters, and having a traffic jam detection device and a specification device for adjusting the control parameters to a detected traffic jam situation. In response to a detected traffic jam, as differentiated, for instance, from a red traffic light, startup instructions can be suppressed, and, in particular, the setpoint acceleration of the vehicle can be reduced.

8 Claims, 2 Drawing Sheets

FOREIGN PATENT DOCUMENTS

| | | |
|---|---|---|
| EP | 1 302 359 | 4/2003 |
| JP | 63-172397 | 7/1988 |
| JP | 8-293100 | 11/1996 |
| JP | 9-42002 | 2/1997 |
| JP | 9-288797 | 11/1997 |
| JP | 10-44826 | 2/1998 |
| JP | 10-178704 | 6/1998 |

* cited by examiner

ADAPTIVE CRUISE CONTROL FEATURING DETECTION OF A TRAFFIC JAM

FIELD OF THE INVENTION

The present invention relates to an adaptive cruise control for motor vehicles, having a sensor system for locating preceding vehicles and a controller which regulates the speed of the vehicle and/or the clearance from a preceding vehicle, based on specified control parameters.

BACKGROUND INFORMATION

Such clearance and speed controllers are also designated as ACC systems (adaptive cruise control) and they typically have a radar sensor as the sensor system, by which the clearances and relative speeds of preceding vehicles can be measured. In this way it is possible to follow a directly preceding vehicle, the so-called target object, at a suitable distance or, more accurately, at a suitably selected time gap. In clear-lane mode, when no target object is present, regulation takes place to a setpoint speed that is given, for instance, by a desired speed selected by the driver.

Examples of specified control parameters are setpoint speed, as well as the "dynamics" which are characterized, for instance, by the upper limits for the amount of the vehicle's acceleration and deceleration that are admissible in closed-loop regulation.

The ACC systems in use up to now are generally provided for travel on superhighways or well-improved country roads, and can only be activated above a certain minimum speed of 30 km/h, for example.

There are, however, ACC systems under development that have a broader functional scope, and they offer the following additional functions, for example: Travel following a preceding vehicle at very low speeds (below 30 km/h), braking to a standstill when the vehicle ahead stops, automatic holding of the vehicle at a standstill, and possibly, an automatic start-up again when traffic permits. An acoustical startup indication for the driver may then precede the startup process, if necessary. This broadened functionality is often collectively designated as a stop & go function.

Telematics systems are known, for the improvement of traffic flow, by which traffic jams in the highway network are automatically detected and can be reported to a traffic control center. German patent documents DE 199 17 154, DE 101 26 872 and DE 196 06 258 discuss, in this connection, traffic jam detection systems, which are installed onboard of vehicles of a so-called random sample fleet, and which are in a position to detect a traffic jam situation with the aid of the speed profile of their own vehicle. According to DE 196 06 258, the speed of the vehicle is continuously recorded and is classified according to specified speed classes. The classification result is then submitted to an integration process over time, and from the integration result, with the aid of fuzzy logic, a probability value is calculated for the presence of a traffic jam situation.

SUMMARY OF THE INVENTION

The exemplary embodiments and/or exemplary methods of the present invention, having the features described herein, makes it possible automatically to detect a traffic jam situation, within the scope of the adaptive cruise control, and then to adapt the control parameters automatically to the special conditions of such a traffic jam.

The exemplary embodiments and/or exemplary methods of the present invention particularly makes possible, in a traffic jam, carrying out a regulation based on reduced dynamics, so that starting processes, acceleration processes and braking processes take place at reduced dynamics, which leads to a more quiet and more fuel-saving mode of operation.

If the regulating functions are available not only on roads free of cross roads, but also on country roads or in urban traffic, the system should also be in a position to distinguish between a "genuine" traffic jam situation and other traffic situations, in which there may also temporarily be travel at very low speed or coming to a stop, perhaps in response to a red light. Whereas in a traffic jam a low dynamic response is an advantage, by contrast, when driving off from a line at a traffic light, a regulation having a high dynamic response should take place so that, during a green phase of the light, as large a number of vehicles as possible can pass the crossing. According to the exemplary embodiments and/or exemplary methods of the present invention, an adapted system response can be attained in every situation, owing to the automatic traffic jam detection.

Advantageous embodiments and refinements of the present invention are also described herein.

The traffic jam detection may be based on an evaluation of the location signals from the sensor system, that is, for example, from the radar sensor, in combination with an analysis of the speed at which driving took place in the more recent past. It is regarded as characteristic of a traffic jam, in this context, that a preceding vehicle is being followed, that is, that the radar sensor has detected a target object, and that the speed driven for a longer period of time remains within a certain speed range having lower average speed.

In one exemplary embodiment, to calculate the probability of a traffic jam, the difference between a specified limiting speed and the instantaneous travel speed is integrated with respect to time. The longer the driven speed remains below the limiting speed, the greater is the probability of a traffic jam. If the limiting speed is exceeded, the probability of a traffic jam does not decrease abruptly to zero, rather it falls off gradually, corresponding to the decrease in the integral with respect to time of the speed difference. It is ensured thereby that a short "intermediate spurt", which happens on occasion in traffic jams, is not erroneously interpreted as a break up of the traffic jam.

The integration of the time difference may be suspended when the speed being driven falls below a lower limiting speed. This prevents an intermittent standstill of the vehicle, for instance, in front of a traffic light, from leading to a continual increase in the integral, and being then erroneously interpreted as a traffic jam situation.

The integration may be discontinued even if the integral has reached a certain maximum value. This avoids having the integral assume extremely high values in response to a longer lasting traffic jam, which would have the undesired consequence that the break up of a traffic jam would only be detected late, namely, only when the integral has decreased again from a very high value to a low value.

In order to make possible a traffic jam detection in the sense of a yes/no statement, the traffic jam probability ascertained by the integration can be compared to an upper and a lower threshold value. The traffic jam signal takes on the value "yes" in response to an exceeding of the upper threshold value, and it takes on the value "no" again in response to falling below the upper threshold value. The upper threshold value can, in this context, be identical to the maximum value at which the integration is discontinued. In addition, the control signal assumes the value "no" and the integral is reset to zero if the radar sensor is no longer locating a preceding vehicle.

An appropriate value for the other limiting speed, which is required for the calculation of the integral, can be determined empirically ahead of time. This value may be a function of the recognized type of road, so that it is higher, for example, on superhighways than in urban traffic. For the recognition of the type of road involved, in this context, it is expedient to link the adaptive cruise control to a navigation system that is possibly present in the vehicle.

The magnitude of the upper limiting speed may likewise be a function of the number of lanes, as well as a function of in which lane one's own vehicle is located. For example, the upper limiting speed could be higher in the left lane than in the right lane.

The lower limiting speed can also be a function of the type of road and/or of the lane, and can also, for instance, be specified to be a certain percentage of the upper limiting speed. The type of road and/or the lane can alternatively, or in addition, also go into the determination of the threshold values to which the integral is compared.

In response to a detected traffic jam, an adjustment may take place of the control parameters which determine startup dynamics and/or the braking dynamics of the vehicle, so that more weight is given to comfort than to dynamic response in traffic jam situations, whereas on the other hand, for instance in a startup situation from a traffic light, more weight is placed on a higher dynamic response.

In front of a traffic light installation, the boundaries between a startup situation and a traffic jam may be fluid, for instance if the line of vehicles in front of the light is so long that the intersection at the light can only be passed after several green phases. What is typical in such situations is that the differences between the red phases and the green phases become more and more blurred with increasing distance from the traffic light installation, that is, at the end of the line a traffic jam-like situation prevails with congesting traffic, while with increasing approach to the crossing at the light, an ever clearer change can be noted between standstill phases and phases having a relatively high speed. When there is a suitable selection of the limiting speed, the system will behave in such a way that, in response to the light crossing, there is automatically a switchover from traffic jam operation to a higher dynamic response that is appropriate for a startup situation before a traffic light.

Known controllers having a stop & go function are frequently designed so that after a vehicle's standstill, especially when this standstill has lasted a certain length of time, the driver receives an acoustical, an optical or a haptic startup instruction before the automatic startup process is initiated (and possibly only after acknowledgement on the part of the driver). However, in traffic jam situations, the frequent emission of such startup instructions is perceived as being disturbing. Therefore, an expedient adjustment to the detected traffic jam situation can also be that, when the traffic jam is detected, the output of the startup instruction before the initiation of the automatic startup process is suppressed.

According to one refinement of the exemplary embodiments and/or exemplary methods of the present invention, it is also conceivable that, in response to a traffic jam detection, the setpoint speed that corresponds to the desired speed, selected by the driver before driving up to the end of the traffic jam, is reduced to a lower value so that the vehicle, at least after a longer period in a traffic jam, does not autonomously accelerate to the speed that was set before, but first waits instead for a renewed confirmation by the driver (increase in the desired speed).

Finally, the device for traffic jam detection provided according to the present invention can also be made usable for other vehicle systems, for instance, for an automatic transmission of a traffic jam report to a traffic control center, for a command to the navigation system, for calculation a detour route or for a command to the electronic control of the automatic transmission, in order to adjust the switching program of the transmission to the traffic jam situation.

An exemplary embodiment of the present invention is represented in the drawings and explained in greater detail in the following description.

DETAILED DESCRIPTION

Figure 1:
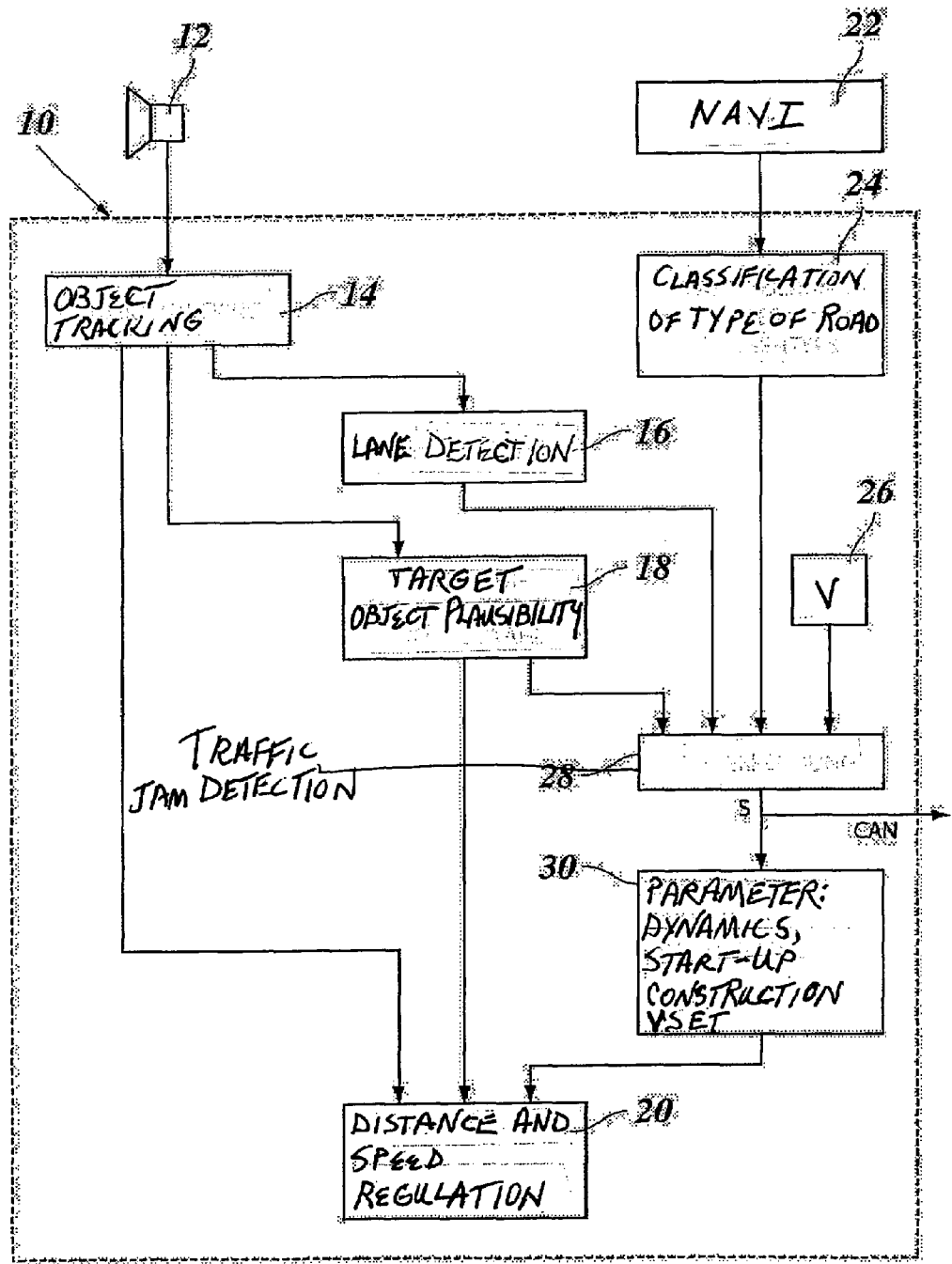
FIG. 1 shows a block diagram of an adaptive cruise control.

FIG. 1 shows an ACC system 10 having stop & go function, whose basic design and mode of operation may be assumed to be known and are therefore sketched only briefly, in this instance.

A radar sensor 12, having angular resolution and being built into the front of the vehicle, supplies location data (distances, relative speeds and azimuth angles) of the located objects to ACC system 10. The measured data are updated cyclically. In a tracking module 14, the current measuring data are respectively compared to the measuring data from previous measuring cycles, so that the movements of the individual objects can be tracked.

A course prediction module (not shown) is used to estimate the expected course of one's own vehicle, for instance with the aid of the roadway curvature in the roadway section that was just driven through. With the aid of the predicted course, a travel route envelope is then determined within which those vehicles have to be located which can be considered as target object for the clearance regulation.

However, since tracking module 14 is also in a position to detect passed or passing vehicles in adjacent lanes, information can also be obtained in a lane detection module 16 as to how many driving lanes the currently traveled directional roadway has, and on which of these lanes one's own vehicle is located.

The objects located and tracked in tracking module 14 are checked for plausibility in plausibility checking module 18, that is, for each object a probability is given that it is located within the travel route envelope. It is taken into consideration, in this context, that the location data, particularly the transverse position data, have certain error tolerances which increase with increasing object clearance. If the probability that the object is located within the travel route envelope is above a certain threshold value, the object is "checked for plausibility", that is, it is treated as a relevant object which is located in one's own lane. Among the objects thus checked for plausibility, that object having the smallest clearance is finally selected as the target object for the clearance regulation.

The actual clearance regulation takes place in a controller 20, with the aid of the location data of the target object, by intervention in the drive system and, if necessary, also the braking system of the vehicle, so that the target object is followed at a time gap that is selectable by the driver within certain limits. If there is no target object present, then the system is in clear-lane mode, and regulation is performed to a desired speed selected by the driver.

ACC system 10 described here has an interface to a navigation system 22 of the vehicle. This navigation system includes a road map stored in digital form, and with the aid of a GPS system (global positioning system) it ascertains the current position of one's own vehicle, so that data concerning the type of road (superhighway or country road) as well as concerning imminent exits, crossroads, junctions and the like are available in a classification module 24 of the ACC system. With the aid of the data supplied by the navigation system, one can decide, in addition, in which national territory the vehicle is located, and whether the roadway section ahead is a country road outside of closed communities or a road within a community, so that information can also be made available about respectively applicable legal speed limits.

The data from classification module 24 and lane detection module 16, together with a current travel speed V of the vehicle measured by a speed sensor 26, are supplied to a traffic jam detection device 28. In addition, traffic jam detection device 28 receives the information, as to whether a target object has been selected and is being followed, from plausibility check module 18.

In light of these data, traffic jam detection device 28 decides whether one's own vehicle is located in a traffic jam situation or not, and it does this with the aid of an algorithm which will be explained in greater detail below, in connection with FIG. 2. In accordance with this, traffic jam detection device 28 transmits a logical traffic jam signal S, which assumes either a value "yes" or "no", to a specification device 30, which specifies a number of control parameters for controller 20.

These control parameters include, for one, a number of dynamic response parameters which establish, for instance, how strongly one's own vehicle can be accelerated or decelerated at a maximum, in order to keep the distance from the target object, and which acceleration curve is to be valid for the automatic startup from a standstill. In response to a detected traffic jam, these parameters are generally modified in the sense of lower dynamic response, that is, accelerations and decelerations that are smaller only in absolute value are admitted, so that in traffic jam operation a more comfortable and fuel saving mode of operation is attained. A parameter can optionally also be varied which determines at which clearance and/or which speed of the preceding vehicle an automatic startup process is initiated.

An additional parameter relates to the output of acoustical, optical or haptic startup instructions to the driver before the initiation of the automatic startup process. For instance, in the normal stop & go operation, when there is no traffic jam, it may be provided that a startup instruction is output when the standstill time of the vehicle has exceeded a certain value of, for instance, a few seconds. However, if traffic jam detection device 28 has detected a traffic jam situation, these startup instructions are completely suppressed, so that the driver will not feel disturbed by the frequent occurrence of such instructions.

In the example shown, an additional parameter is setpoint speed VSET, to which controller 20 regulates in clear-lane mode. Normally this setpoint speed is equivalent to the desired speed selected by the driver. However, when a traffic jam has been detected and the traffic jam situation has persisted for a certain time period, there is the danger that the driver has forgotten that a relatively high desired speed is still being stored, and the driver could be surprised by the automatic acceleration to this high desired speed, when the traffic jam breaks up. Therefore, under these conditions, it is expedient to reduce the setpoint speed to a certain value, such as 60 or 80 km/h on superhighways, so that if the driver wishes to drive faster, he has actively to input a new desired speed by operating the accelerator and/or a switch.

Finally, the traffic jam signal emitted by detection device 28 is also made available to other system components of the vehicle, via a vehicle-dedicated CAN bus, for instance, to the transmission control (not shown) or to navigation system 22 for the calculation of a route that will bypass the traffic jam.

The mode of operation of traffic jam detection device 28 will now be explained in greater detail in light of the diagram shown in FIG. 2.

As long as plausibility checking module 18 reports that a target object is present, speed V of the vehicle reported by speed sensor 26 is continually evaluated in traffic jam detection device 28. Curve 32 in FIG. 2 shows a typical curve over time of speed V, before and after a traffic jam. Measured speed V is compared to an upper limiting speed V1. This limiting speed V1 can, for instance, generally amount to 40 km/h, or it can vary depending on the type of road and on the lane being driven. For example, in the left or the middle lane of a superhighway, it can amount to 60 km/h, in the right lane of a superhighway and on country roads it can amount to 40 km/h, and in town areas (at a general speed limit to 50 km/h) it can amount to only 30 km/h.

Figure 2:
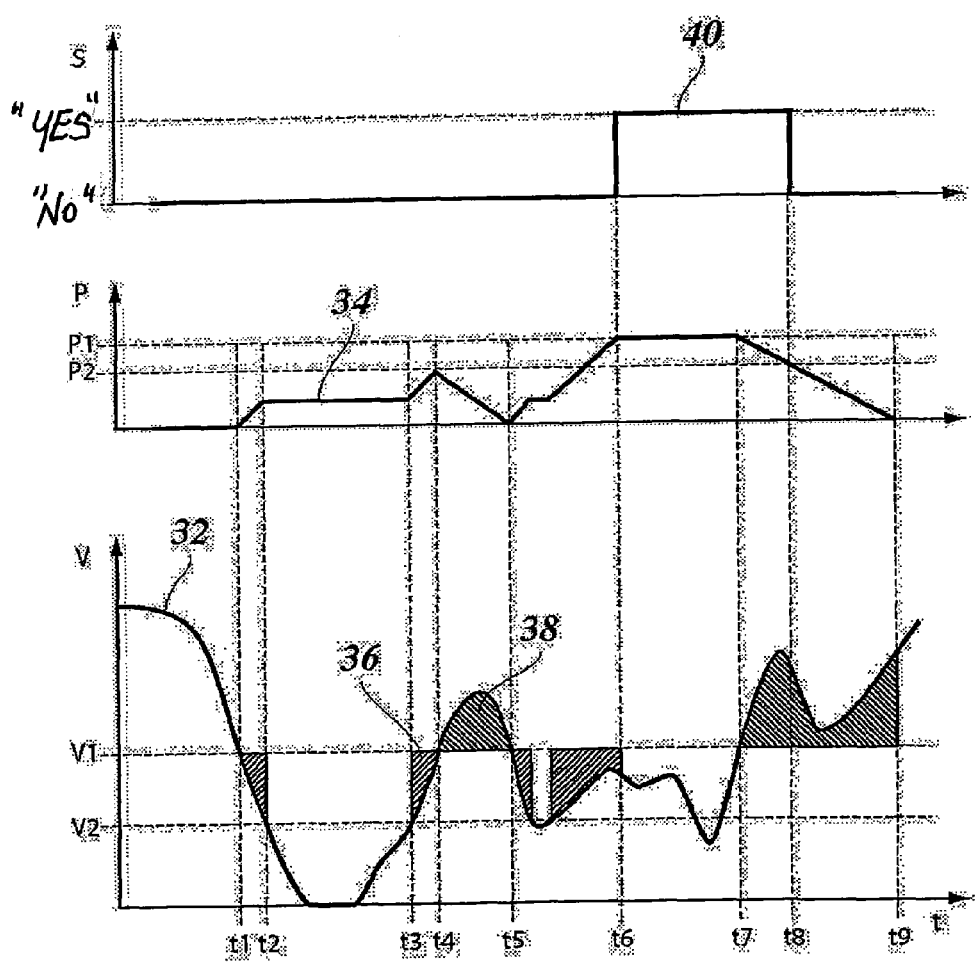
FIG. 2 shows a timing diagram of various signals in a device for traffic jam detection.

Before time t1 in FIG. 2, V is greater than V1, and nothing indicates a traffic jam. However, as soon as V drops below V1, the difference V1−V is integrated over time. The curve over time of the integral P thus obtained is shown in FIG. 2 by curve 34. At time t2, if speed V drops to a lower limiting speed V2 which, for instance, amounts to 50% of V1, the integration is discontinued and the value of integral P is maintained. If speed V increases again above V2, at t3 in the example shown, the integration is continued. The positive contributions to integral P are also shown in FIG. 2 as areas 36 hatched in rising fashion, which are bordered by curve 32 and straight line V=V1.

At point t4, when speed V rises again to more than V1, the integrand becomes negative, and integral P decreases again. The corresponding negative contribution to integral P is shown by areas 38, hatched in falling fashion.

Integral P may be interpreted as a probability of a traffic jam. As long as this traffic jam probability lies below an upper threshold value P1, logical traffic jam signal S, that is output by traffic jam detection device 28 and represented in FIG. 2 by curve 40, has the value "no".

In the example shown, speed V intermittently has the value 0 in the interval between t2 and t3, that is, the vehicle has stood still, for example, before a red light. However, since the integration is discontinued below V2, this does not lead to an increase in integral P, and the probability of a traffic jam remains less than P1. Consequently, waiting in a traffic light line is not falsely interpreted as a traffic jam.

In the example shown it is assumed that the vehicle drives up to the end of the traffic jam line in the time interval between t4 and t5, so that controller 20 induces a deceleration of the vehicle. At time t5, V drops below V1 again, and the integrand becomes positive again.

It is characteristic for a traffic jam situation that speed V remains below V1 for a longer time period, so that integral P finally reaches upper threshold value P1 at time t6. This threshold value P1 is selected so that it is not attained if the vehicle stops only once in front of a red light and, in this context, passes the speed range between V1 and V2 for a short time period (in the deceleration phase between t1 and t2 and in the startup phase between t3 and t4). Only in the case of longer travel at a speed below V1 is threshold value P1 attained, and traffic jam signal S changes to condition "yes". From time t6 on, the control parameters are thus adjusted to traffic jam operation by specification device 30. In addition, from this point in time on, the integration is discontinued again, so that integral P does not increase beyond upper threshold value P1.

When the traffic jam breaks up again, speed V increases again, and exceeds upper limiting speed V1 at t7. At this moment the integration is continued again, but the integrand is now negative, so that the probability of a traffic jam P decreases. If speed V should again fall below V1 (not shown in the drawing), the integrand would become positive again, and the signal would grow again up to a maximum of P1. In the example shown, however, speed V remains greater than V1, and integral P falls below a lower threshold value P2 at time t8. This has the effect that traffic jam signal S changes again to condition "no", that is, the system has detected the break up of the traffic jam, and the control parameters are reset to the normal values.

The integration will be continued, however, even after time t8, until finally integral P has decreased to 0 at time t9. Only then is the integration ended, so that the state prevailing before time t1 is produced again.

If, however, speed V were to fall below V1 again in time interval t8 and t9, integral P would immediately rise again from the value reached at this time, so that upper threshold value P1 would be reached correspondingly faster. This being the case, between times t8 and t9 there remains a certain "memory" of the preceding traffic jam occurrence.

According to one modification (not shown) it is conceivable that one might set integral P back to 0 (whereby S also assumes again the value "no"), as soon as speed V exceeds a speed value V3 that is clearly greater than V1.

Furthermore, whereas in the above-described exemplary embodiment it was assumed that integral P is formed by the integration of the speed difference V1−V, it is also possible, in an alternative specific embodiment, simply to count the time within which speed V is greater than V1 or between V1 and V2. Then the integrand would be: sgn(V1−V), where sgn is the signum function which has the value +1 for positive arguments and the value −1 for negative arguments.

What is claimed is:

1. An adaptive cruise control for a motor vehicle, comprising:
   a sensor system for locating preceding vehicles;
   a controller to regulate at least one of a speed of the motor vehicle and a clearance from a preceding vehicle, based on specified control parameters;
   a traffic jam detection device, wherein the output of the traffic jam device indicates one of: a) a traffic jam and b) no traffic jam, wherein, the output is calculated from an integrated variable indicating a probability of a traffic jam, wherein a value of the integrated variable is a) decreased, if the speed of the motor vehicle is above an upper limiting speed, and the value of the integrated variable is above a lower threshold, b) held constant, if the speed of the motor vehicle is below a lower limiting speed, c) increased if the speed of the motor vehicle is between the upper limiting speed and the lower limiting speed, and the value of the integrated variable is below an upper threshold; and
   a specification device to adjust the control parameters for a detected traffic jam situation.

2. The adaptive cruise control of claim 1, wherein at least one of the control parameters is a dynamics parameter which characterizes at least one of an acceleration response and a deceleration response of the motor vehicle as determined by the controller.

3. The adaptive cruise control of claim 1, wherein at least one of the control parameters is a parameter which determines whether a startup instruction is output to the driver before a startup process automatically initiated by the controller, and wherein the specification device is configured to block the output of the startup instruction in a traffic jam situation.

4. The adaptive cruise control system of claim 1, wherein at least one of the control parameters is a setpoint speed for the speed regulation in the absence of a preceding vehicle, and wherein the specification device is configured to reduce the setpoint speed from a desired speed selected by the driver to a lower speed, one of (i) after detecting a traffic jam situation, and (ii) at least when the traffic jam situation has lasted a certain length of time.

5. The adaptive cruise control system of claim 1, wherein the traffic jam detection device has an output via which a traffic jam signal is also able to be output to other system components of the motor vehicle.

6. The adaptive cruise control system of claim 1, wherein the traffic jam detection device is configured to decide that there is no traffic jam if the sensor system does not locate a preceding vehicle which is being followed as a target object.

7. The adaptive cruise control of claim 1, wherein the traffic jam detection device is configured to indicate a traffic jam if the integrated variable reaches the upper threshold value, and to indicate no traffic jam if the integrated variable falls below the lower threshold value.

8. The adaptive cruise control of claim 1, further comprising:
   a classification device to classify a road traveled by the vehicle,
   wherein the traffic jam detection device is configured to at least one of (i) vary at least one of the upper and the lower limiting speeds, and (ii) vary at least one of the upper and the lower threshold values as a function of a road type.

* * * * *